United States Patent

Öberg et al.

[11] Patent Number: 6,160,648
[45] Date of Patent: Dec. 12, 2000

[54] METHOD AND ARRANGEMENT FOR DETECTING FAULTS IN A NETWORK

[75] Inventors: Magnus Öberg, Hägersten; Bo Lagerström, Vita Liljansväg; Mangus Sundelin, Rörstrandsgatan; Bengt Johansson, Hägersten, all of Sweden

[73] Assignee: Telefonaktiebolaget LM Ericsson, Stockholm, Sweden

[21] Appl. No.: 08/934,218

[22] Filed: Sep. 19, 1997

[30] Foreign Application Priority Data

Sep. 23, 1996 [SE] Sweden .................................. 9603458

[51] Int. Cl.[7] ...................................................... H04B 10/08
[52] U.S. Cl. ........................ 359/110; 359/119; 359/161; 359/166; 370/222; 370/223; 370/224
[58] Field of Search ..................................... 359/110, 119, 359/166, 161; 370/222, 223, 224

[56] References Cited

U.S. PATENT DOCUMENTS

| | | | |
|---|---|---|---|
| 4,320,508 | 3/1982 | Takezoe | 371/22 |
| 5,179,548 | 1/1993 | Sandesara | 370/16.1 |
| 5,265,510 | 11/1993 | Hoyer-Ellefsen | 83/471.3 |
| 5,365,510 | 11/1994 | Nicholson et al. | 370/16 |
| 5,442,623 | 8/1995 | Wu | 370/16.1 |
| 5,453,827 | 9/1995 | Lee | 356/73.1 |
| 5,933,258 | 8/1999 | Flanagan et al. | 359/110 |

FOREIGN PATENT DOCUMENTS

| | | |
|---|---|---|
| 0 677 936 A1 | 10/1995 | European Pat. Off. . |
| 0677936A1 | 2/1996 | European Pat. Off. . |
| 2 292 495 A1 | 2/1996 | United Kingdom . |
| 2292495 | 2/1996 | United Kingdom . |

*Primary Examiner*—Leslie Pascal
*Assistant Examiner*—Vu Lieu
*Attorney, Agent, or Firm*—Burns, Doane, Swecker & Mathis, L.L.P.

[57] ABSTRACT

The present invention relates to an arrangement and a method for detecting faults in an optical fiber network, comprising at least two nodes arranged with at least two optical fibers to a bus with the end nodes connected via two spare fibers. Every node comprising a central module (50), at least two protection switches (60,61) and optical amplifiers (21,22,23,24) and said central module comprising at least one central processor (51), at least one logical unit (52), at least one protection signal transmitter (53) and at least one protection signal monitor (54). The end nodes of the bus transmit a protection signal in at least one direction of the bus and said end nodes can detect the own protection signal and the protection signal transmitted from the other end node. All nodes in the bus can detect Optical Power Loss, OPL. The bus will reshape into new end nodes in case of a fault.

11 Claims, 6 Drawing Sheets

METHOD AND ARRANGEMENT FOR DETECTING FAULTS IN A NETWORK

FIELD OF INVENTION

The present invention relates to an arrangement and to a method for detecting faults in a logic network, particularly an optical fibre network.

DESCRIPTION OF THE BACKGROUND ART

Optical fibres are being used to an ever increasing extent as transmission media in the field of telecommunications and data communications. The use of light signals for communication can result in very fast data transmissions.

Prior publications U.S. Pat. No. 5,265,510, U.S. Pat. No. 5,179,548 and EP-A1 677 936 describe different methods of rectifying cable breaks in optical bus networks. In brief, the protective system involves connecting to the various system nodes one spare fibre in the case of unidirectional communication and two spare fibres in the case of bidirectional communication, in a manner similar to the standard connections but separated physically therefrom. Communication on the spare fibre/s is commenced when a standard fibre has broken at some point or other.

SUMMARY OF THE INVENTION

A break in communication in an optical bus network may have several causes. A number of solutions are known for restoring communication in the event of cable breakage. One object of the present invention is to detect and localize a fibre/cable breakage in a bus-type network that is connected in a ring structure which includes a pair of spare fibres connected between the end-nodes.

The network includes a plurality of nodes disposed in a ring. The ring is broken by deactivation of the pair of fibres between two mutually adjacent nodes. This deactivation can be achieved, for instance, by decoupling on/off switches against the deactivated path (the switches are set to their off-states). The nodes communicate with each other, by transmitting and listening in both directions in the bus. All nodes have a protective means which includes at least one protection signal transmitter that transmits a node specific signal, at least one protection signal monitoring module, and at least two optical on/off switches or devices having a corresponding function.

The protective method uses a specially designed protection signal transmitter. This transmitter may comprise a digitally modulated laser or a sinusoidal pilot tone. Each protection signal transmitter is node-specific, either through a digital code or a special frequency. Each of the two nodes that constitute end-nodes in the bus sends its respective protection signal both in towards the bus and out on the deactivated path, this path being comprised of the pair of protection fibres.

The protection signal monitoring module includes at least one protection signal detector which must be able to listen and to identify two simultaneously occurring signals. Each node includes on/off switches, or corresponding devices, wherein the switch or like device directed to the reserve path in each end-node is switched off. This is done to prevent channels from travelling double paths and also to prevent circulation of channels and noise. The protection signals are added downstream of the on/off switches in both directions, and the end-nodes on each fibre will thus have access to their own protection signal from both directions, said protection signal having passed around the entire ring, and to the protection signal of the other end-node from both directions.

The end-nodes in the bus are able to determine whether a fibre has broken on the incoming bus fibre or on the outgoing spare fibre, by analyzing protection signal losses of the own end-node and protection signal losses of the other end-node. If a breakage has occurred on the bus fibre, the on/off switch is switched to the spare fibre and the protection signal then switched off. Normally, both fibres are broken in a cable breakage, and the other end-node thus carries out the same procedure at the same time. In the case of a single fibre breakage, the procedure is delayed until the end-node that has detected the breakage has switched its on/off switch to the off-state and actuated its amplifier. In the case of a breakage on the spare fibre, this breakage is detected and reported to a monitoring system. The nodes that border the fibre breakage or fibre breakages detect that the light to the node disappears, so-called Optical Power Loss, OPL, and switch their respective on/off switches to their off-state and actuate the amplifiers against the fibre breakage and send their protection signals in the network. These procedures provide the bus with new end-nodes and all communication has been re-established. The protection signal can also be used to adjust the amplification of the optical amplifiers present in the network. The amplitude of the protection signal is measured and used as a reference signal in checking the amplification of the amplifier. The optical amplifier is controlled to keep the amplitude of the protection signal constant and therewith all other wavelength channels.

One advantage afforded by the present invention is that the spare fibre can be monitored continuously without transmitting data on the fibre.

Another advantage afforded by the present invention is that the nodes can make local decisions without requiring any information other than the presence or absence of the protection signals and the presence or absence of optical input power.

Still another advantage afforded by the invention is that the protection hardware is separate from the traffic equipment.

Yet another advantage afforded by the invention is that the simple logic is able to achieve a fast protection switching time.

Still another advantage afforded by the present invention is that all protection signal transmitters can use one and the same wavelength and therewith save usable optical wavelength channels.

Still another advantage afforded by the present invention is that the protection signal can be used to adjust the power output of the optical amplifiers. Another advantage afforded by the present invention is that the protection method is in operation from the time that the network carries no traffic channels until the network is fully equipped.

Still another advantage afforded by the present invention is that the protection fibre is monitored for breakages.

The invention will now be described in more detail with reference to preferred embodiments thereof and also with reference to the accompanying drawings.

DETAILED DESCRIPTION OF PREFERRED EMBODIMENTS

Figure 1:
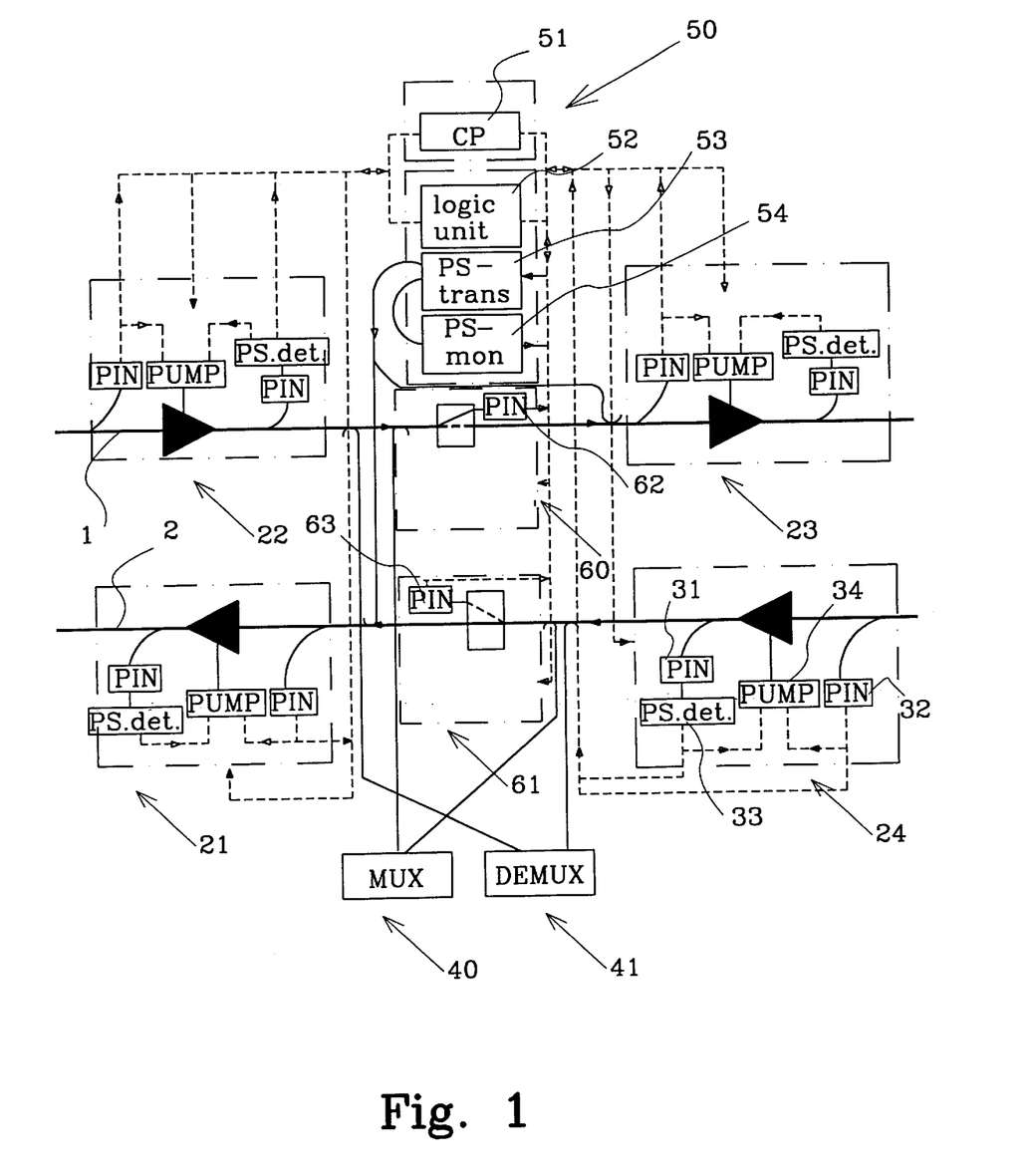
FIG. 1 illustrates one embodiment of the invention on a network node.

Each node is constructed in the manner illustrated in FIG. 1. The nodes are mutually connected by a pair of standard fibres to form a bus, and a pair of spare fibres are provided between the bus end-nodes. The node includes an optical fibre 1 with traffic in one direction, and another optical fibre 2 with traffic in the opposite direction to the traffic on the fibre 1. The nodes also include optical amplifiers 21, 22, 23, 24 which, in turn, include a pair of PIN diodes 31, 32, a protection signal detector 33 and a pump laser 34. The optical amplifiers 21, 22, 23, 24, which are comprised of preamplifiers 22, 24 and booster amplifiers 21, 23, achieve an amplification check with the aid of the protection signal detector 33 to the pump 34?, combined with forward coupling of the total input power to the amplifier. One or the other signal level from the two protection signals, or the mean value of said signal levels, is used to control the power output of the preamplifiers 22, 24 and the booster amplifiers 21, 23. If only one protection signal is received in the node, this value will nevertheless suffice to control the power output. If no signal is received, which may occur briefly during switch-over, the feedback to the laser pump is locked so that the power output is adjusted solely by the forward coupling. Amplification controls can either be implemented in the microprocessor or in fully analogous electronic devices.

The nodes in the network also include multiplexors 40 which function to combine wavelength channels in the network, and demultiplexors 41 which function to separate wavelength channels from the network. The node also has a central module 50 that includes a central processor 51, a logic unit 52, a protection signal transmitter 53 and a protection signal monitor 54, which monitors the operational state of the protection signal transmitter. The central processor is connected to all other modules in the node and has the function of monitoring changes in the network and delivering signals accordingly. The logic unit 52 receives logic signals from the protection signal detectors 33 in the node and from its own protection signal transmitter 53. The logic signals indicate whether the west amplifier 22 or the east 24 amplifier, said amplifiers functioning as preamplifiers, receive or do not receive the protection signals from the own node, or whether said amplifier receives or does not receive the protection signals from the other end-node. Provided that the local protection signal transmitter 53 is functioning, a local decision can be made as to whether a cable breakage has occurred in the spare fibre or in the standard fibre, and also whether the breakage is on an outgoing fibre or on an incoming fibre.

The following algorithm provides protection against the protection switch failing and switching to the wrong state The ring must be broken in order to be called a bus. The logic unit 52 in the end-nodes receives two logic signals that indicate whether or not the optical protection switches 60, 61 of the node are in the wrong state, i.e. are in the off-state when they should be in the on-state and vice versa. In the following instances, based on these logic signals, the booster amplifier 21, 23 downstream of the switches 60, 61 will be switched off:

i) When the PIN diode 62, 63 does not detect a signal when the switch 60, 61 shall be in its off-state and incoming data shall not be forwarded in the spare fibre; and ii) when the PIN diode detects signals when the switch 60, 61 shall be in its on-state and incoming data shall be forwarded to a standard fibre.

These PIN diodes and said logic need, in principle, only be implemented in the standard end-nodes, since all amplifiers are provided with Automatic Power Shutdown, APS. However, all nodes will preferably have this facility for the sake of generalization and user-friendliness.

In the event of a fibre breakage, the logic unit receives a logic signal for each preamplifier that indicates whether the preamplifier 22 or the preamplifier 24 detects no signals at all (LOP). In the event of total absence of signals at the preamplifier 22, 24, the preamplifier switches itself off and its corresponding booster amplifier 21, 23.

The various logic signals generated in each node are as follows:

i) Loss of own protection signal transmitted first through the spare fibre and then back to the node via the standard fibre, so-called Loss of Own Protection Signal Bus Side, LOwnPS-BS;

ii) loss of protection signal transmitted by the other end-node via the standard fibre, so-called Loss of Other Protection Signal Bus Side, LOtherPS-BS;

iii) loss of protection signal transmitted by the other end-node via the spare fibre, so-called Loss of Other Protection Signal Spare Side, LOtherPS-SS;

iiii) loss of all optical data channels, so-called Optical Power Loss, OPL-N, where N is the number of the optical fibre; and iiiii) malfunctioning of own protection signal, so-called Malfunctioning Own Protection Signal Laser Diode, MPSLD.

The following conditions apply for end diodes:

i) If LOwnPS-BS and LOtherPS-BS but not MPSLD but not LOtherPS-SS: Switch the protection switch to on;

ii) if LOwnPS-BS but not MPSLD but not LOtherPS-BS: Report that there is a fault on the spare fibre that passes from this end-node to the other end-node;

iii) if LOtherPS-SS but not LOtherPS-BS: Report that there is a fault on the spare fibre that passes from the other end-node to this end-node; and iiii) if LOtherPS-BS but not LOwnPS-BS but not MPSLD: Report that there is a fault on the other pilot tone.

The following conditions apply for remaining nodes:

i) If OPL: Set the protection switch to off and switch-off the amplifier pair in this direction; this latter procedure is effected automatically when the node is equipped with APS; and ii) if two protection signals are received on one and the same input, east or west, the switch in this node must be set to on. This procedure is used in automatic start-up.

Figure 2:
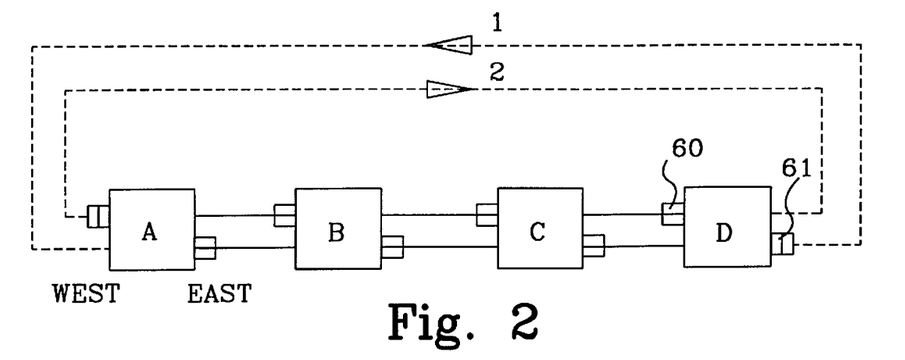
FIG. 2 illustrates a complete network in accordance with the invention.

FIG. 2 illustrates a bidirectional wavelength routed network arranged to form a so-called flex-bus. The bus includes four nodes A, B, C, D which are interconnected by two optical fibres 1, 2. The optical fibres between node A and node B, between node B and node C, and between node C and node D are called standard fibres and the optical fibres between node A and node D are called spare fibres. Each node may have the configuration described with reference to FIG. 1. Only the protection switches 60, 61 have been shown in each node in these Figures. In this configuration, node A and node D are formed as end-nodes in the bus; this is seen by one of the protection switches 60, 61 being in its off-state in each of the two end-nodes. Data traffic is carried in the bus with no problem and no alarm is detected.

Figure 3A:
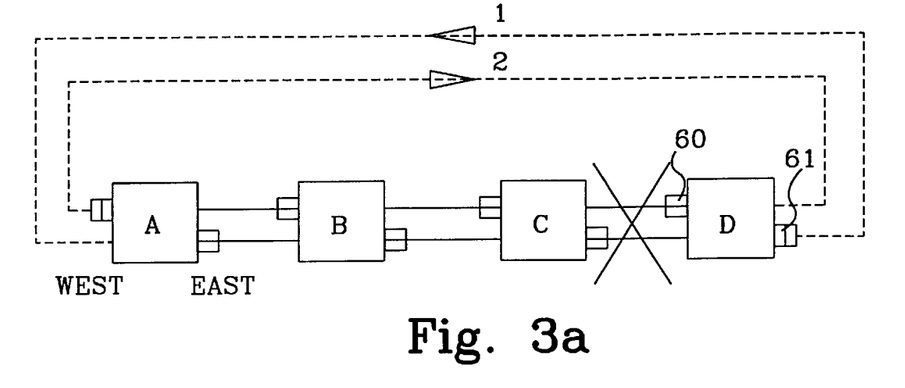
FIG. 3a illustrates a bidirectional fault on standard fibres adjacent an end-node in the network.

FIG. 3a shows the same bus as that shown in FIG. 2 but with the difference that the bus has a bidirectional fault on the standard fibres 1, 2 adjacent an end-node. Node A detects LOwnPS-BS and LOtherPS-BS but not LOtherPS-SS, which implies that the west switch is set to its on-state. Node B receives no alarm. Node C detects OPL-2, which implies that the east switch and the amplifier pair 23, 24 are set to their off-state. Node D detects OPL-1, which implies that the west switch and the amplifier pair 21, 22 are set to their off-state. Node D also detects LOwnPS-SS and LOtherPS-BS but not LOtherPS-SS, which implies that the east switch is set to its on-state.

Figure 3B:
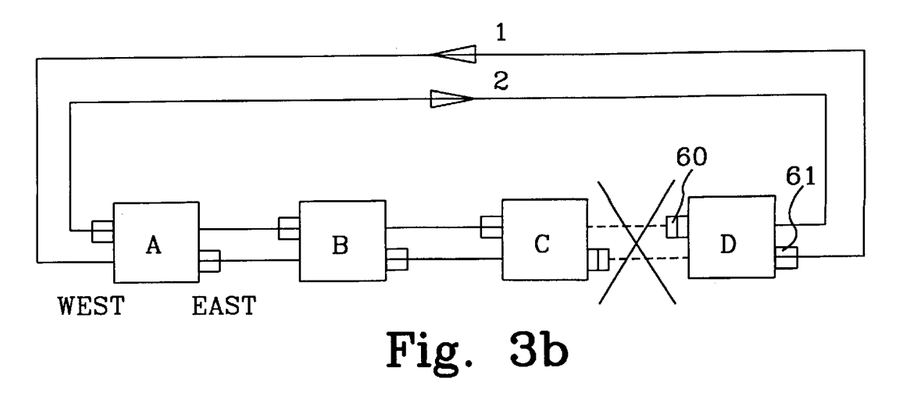
FIG. 3b shows the network of FIG. 3a subsequent to reconfiguration.

FIG. 3b shows the bus when full communication has been re-established. Node A and node B receive no alarm. Node C and node D detect LOwnPS-BS and LOwnPS-SS, and the bus is reshaped so that node C and node D are new end-nodes.

Figure 4A:
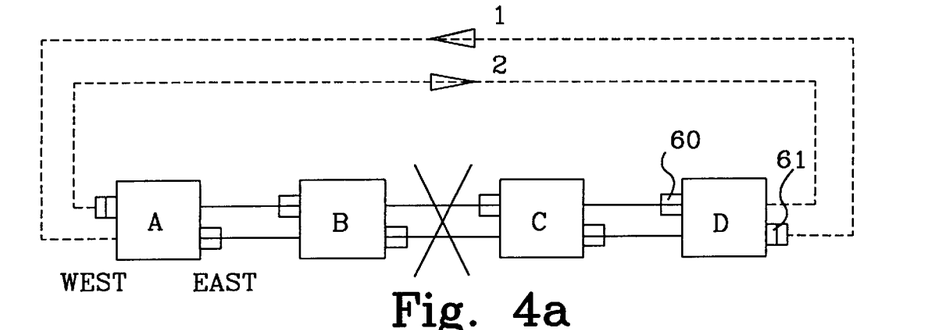
FIG. 4a shows a bidirectional fault on standard fibres between two nodes that are not network end-nodes.

FIG. 4a illustrates the bus with a bidirectional fault on the standard fibres between two intermediate nodes. Node A detects LOwnPS-BS and LOtherPS-SS but not LOtherPS-SS, which implies that the west switch is set to its on-state Node B detects OPL-2, which implies that the east switch and the amplifier pair 23, 24 are set to their off-state. Node C detects OPL-1, which implies that the west switch and the amplifier pair 21, 22 are set to their off-state. node D detects LOwnPS-BS and LOtherPS-BS but not LOtherPS-SS, which implies that the east switch is set to its on-state.

Figure 4B:
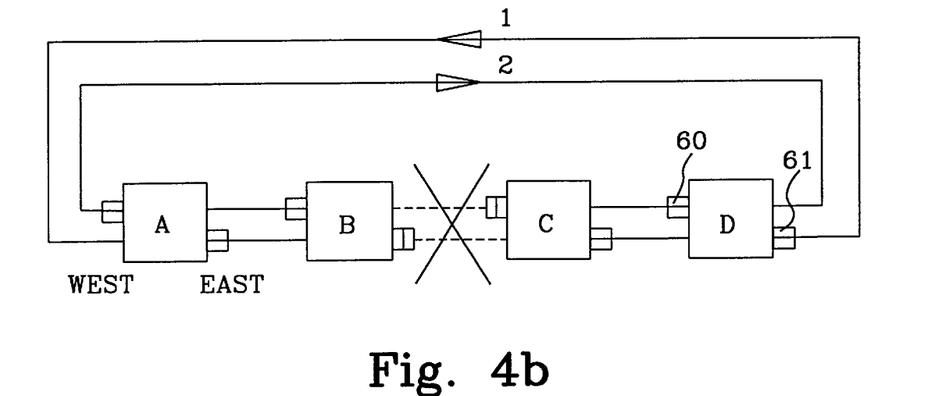
FIG. 4b shows the network of FIG. 4a subsequent to reconfiguration.

FIG. 4b shows the bus after full communication has been re-established. Node B and node C detect LOwnPS-BS and LOwnPS-SS, and the bus is reshaped with node B and node C as new end-nodes.

Figure 5A:
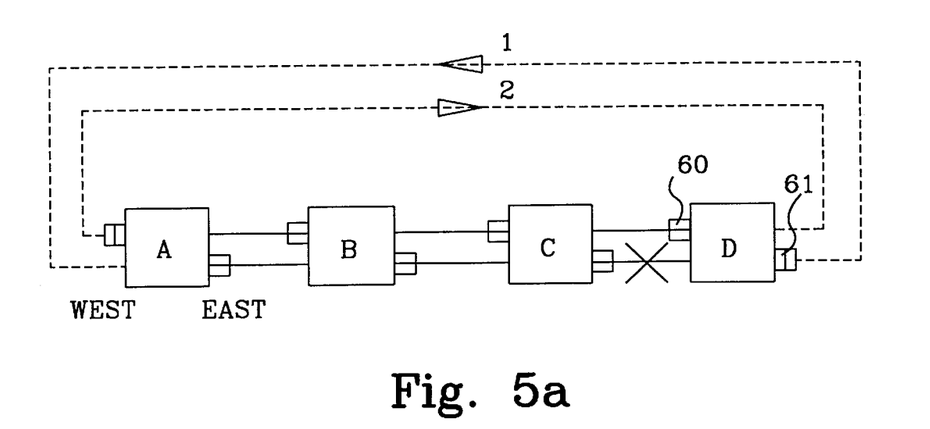
FIG. 5a shows a unidirectional fault on standard fibres adjacent an end-node and with traffic towards said node in the network.

FIG. 5a shows the bus with a unidirectional fault on a standard fibre adjacent an end-node. The fibre breakage is on the fibre in which traffic flows to the end-node. Neither node A, node B nor node C receive any alarm. Node D detects LOwnPS-BS and LOtherPS-BS but not LOtherPS-SS, which implies that the east switch is set to its on-state. Node D also detects OPL-1, which results in the west switch and the amplifier pair 21, 22 being set to their off-state.

Figure 5B:
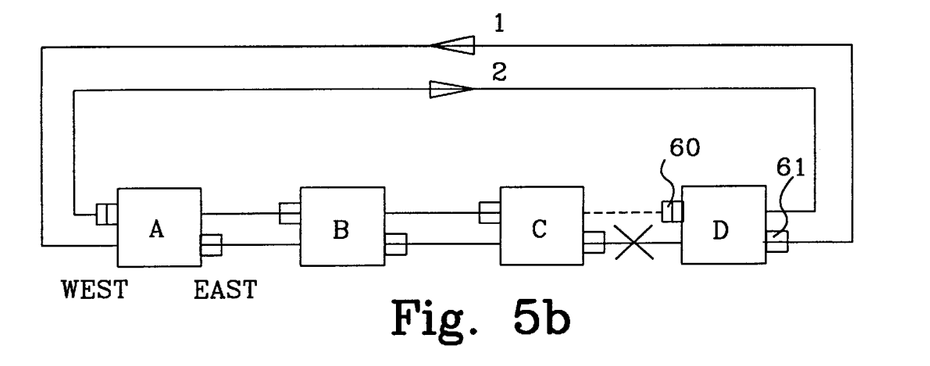
FIG. 5b shows the network of FIG. 5a subsequent to reconfiguration.

FIG. 5b shows the bus in an intermediate stage of the re-establishment of full communication between the nodes. In this case, node A detects LOwnPS-BS and LOtherPS-BS but not LOtherPS-SS, which implies that the west switch is set to its on-state. Node B receives no alarm. Node C detects OPL-2, which causes the east switch and the amplifier pair 23, 24 to be set to their off-state. Node D still detects LOwnPS-BS (west side) and LOtherPS-BS (west side) but not LOtherPS-SS (east side). Communication between the bus nodes is now re-established.

Figure 6A:
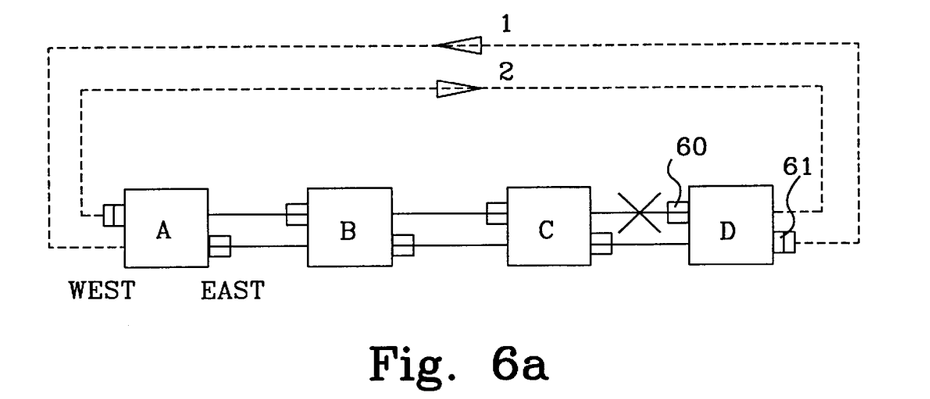
FIG. 6a shows a unidirectional fault on a standard fibre adjacent an end-node, with traffic from the end-node in the network.

FIG. 6a shows the bus with a unidirectional fault on the standard fibre adjacent an end-node. The breakage has occurred on the fibre in which traffic flows from the end-node. Node A detects LOwnPS-BS and LOtherPS-BS but not LOtherPS-SS, therewith causing the west switch to be set to its on-state. Node B and node D receive no alarm. Node C detects OPL-2, which causes the east switch and the amplifier pair 23, 24 to be set to their off-state.

Figure 6B:
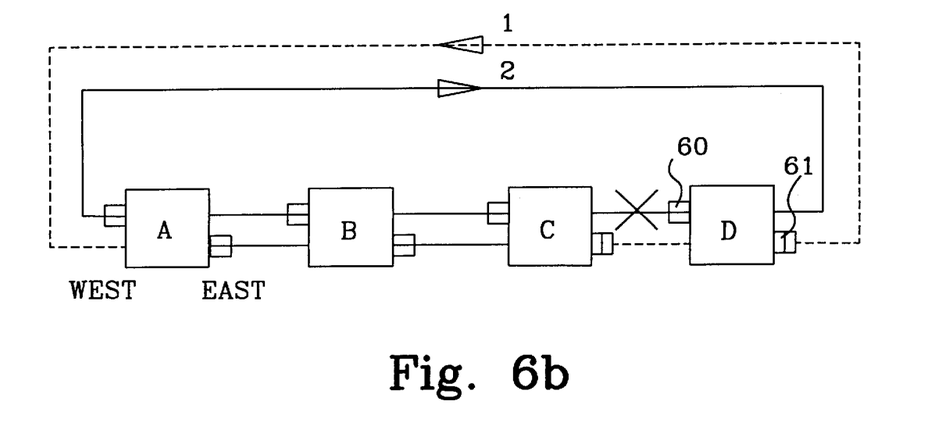
FIG. 6b shows the same network as that shown in FIG. 6a with the repair process in an advanced stage.

FIG. 6b shows an intermediate stage in the repair of the bus. Node A still detects LOwnPS-BS and LOtherPS-BS but not LOtherPS-SS. Node B receives no alarm. Node C still detects OPL-2. Node D detects LOwnPS-BS and LOtherPS-BS but not LOtherPS-SS, which implies that the east switch is set to its on-state. Node D also detects OPL-1, which causes the west switch and the amplifier pair 21, 22 to be set to their off-state.

Figure 6C:
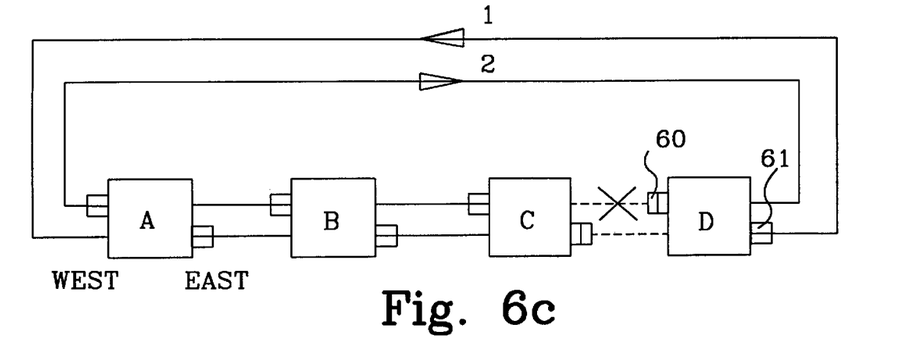
FIG. 6c shows the network of FIG. 5b subsequent to reconfiguration.

FIG. 6c shows the bus with full communication, where node C and node D are end-nodes.

Figure 7A:
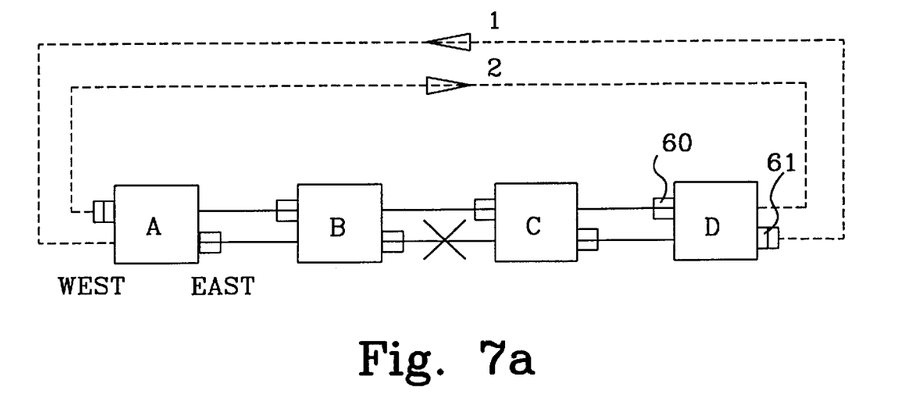
FIG. 7a shows a unidirectional fault on the standard fibre between two nodes that are not end-nodes in the network.

FIG. 7a shows the bus with a unidirectional fault on the standard fibre between two nodes that are not end-nodes, i.e. between two intermediate nodes. Neither node A nor node B receives an alarm. Node C detects OPL-1, which causes the west switch and the amplifier pair 21, 22 to be set to their off-state. Node D detects LOwnPS-BS and LOtherPS-BS but not LOther-PS-SS, which implies that the east switch is set to its on-state.

Figure 7B:
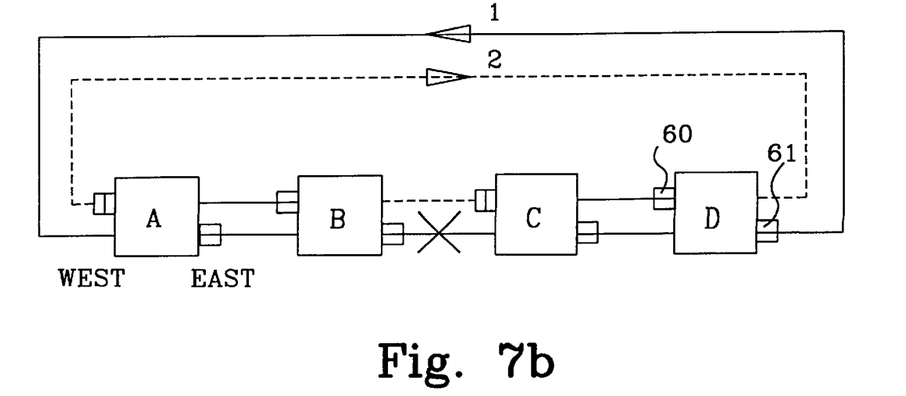
FIG. 7b shows the same network as that shown in FIG. 7a but with the repair process in an advanced stage.

FIG. 7b shows an intermediate stage in the repair of the bus. Node A detects LOwnPS-SS and LOtherPS-BS but not LOtherPS-SS, which implies that the west switch is set in its on-state. Node B detects OPL-2, which causes the east switch and the amplifier pair 23, 24 to be set to their off-state. Node C still detects OPL-1. Node D still detects LOwnPS-BS and LOtherPS-BS but not LOtherPS-SS.

Figure 7C:
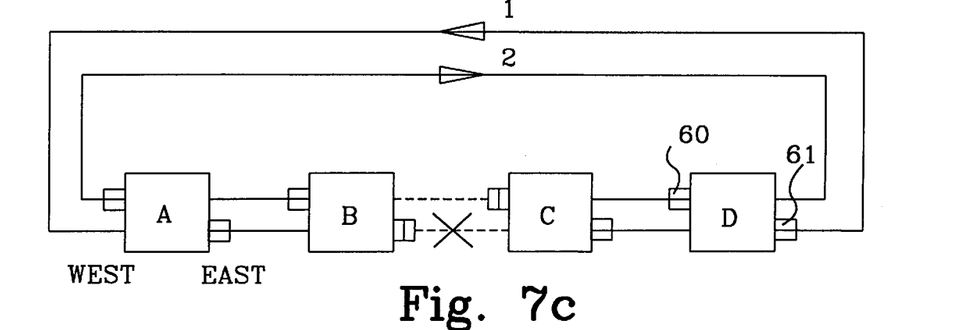
FIG. 7c shows the network of FIG. 7b subsequent to reconfiguration.

FIG. 7c shows all communication re-established in the bus.

Figure 8:
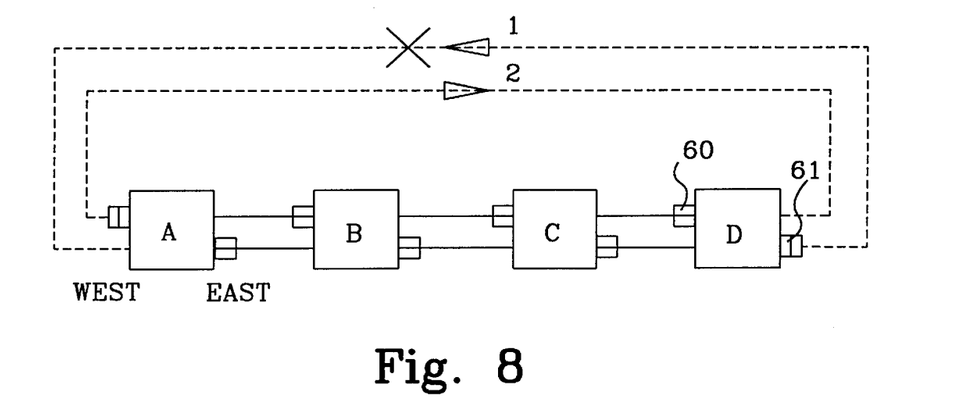
FIG. 8 shows a unidirectional fault on the spare fibre in the network.

FIG. 8 shows the bus with a unidirectional fault on a spare fibre. Node A detects LOwnPS-BS and LOtherPS-BS but not LOtherPS-BS, which causes an alarm to be sent to the effect that spare fibre 1 is broken. Neither node B nor node C receive an alarm. Node D detects LOwnPS-BS but not LOtherPS-BS, which causes an alarm to be sent to the effect that the spare fibre 1 is broken.

Figure 9:
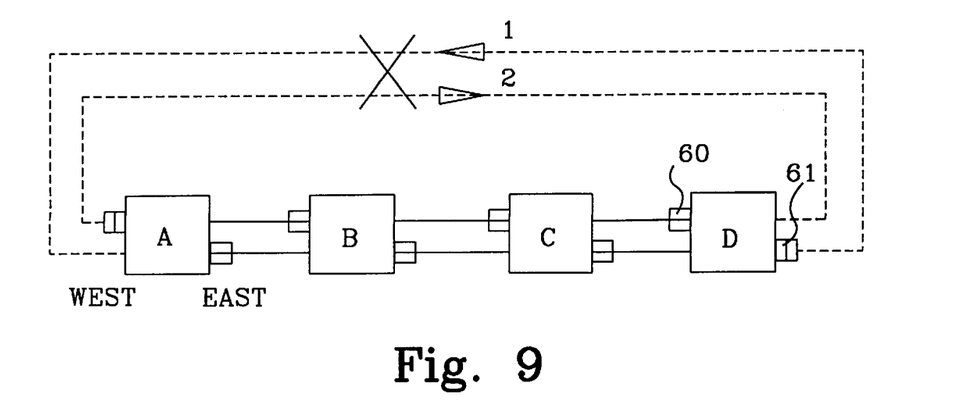
FIG. 9 shows a bidirectional fault on the spare fibres in the network.

FIG. 9 shows a bus with a bidirectional fault on the spare fibres. Node A detects LOwnPS-BS and LOtherPS-SS but not LOtherPS-BS, which implicates an alarm to the effect that a fault exists on both spare fibres. Neither node B nor node C receive an alarm. Node D detects the same as node A, i.e. detects LOwnPS-BS and LOtherPS-SS but not LOtherPS-BS, which causes an alarm to be sent to the effect that there is a fault on both spare fibres.

It will be understood that the invention is not restricted to the aforedescribed and illustrated exemplifying embodiments thereof and that modifications can be made within the scope of the following claims.

What is claimed is:

1. An arrangement for detecting faults in an optical fibre network comprising:
   at least two nodes; and
   at least two optical fibres coacting with the nodes to form a bus, wherein the bus end-nodes are coupled to a pair of spare fibres, wherein each node has a central module which includes at least one central processor, at least one logic unit, at least one protection signal transmitter, at least one protection signal monitor, at least two protection switches, and optical amplifiers, and wherein the protection signal transmitter is adapted for transmission of a node specific protection signal in at least one of the two directions of the bus; the nodes are adapted for detection of losses of all optical signals; and the bus end-nodes are adapted for detecting their own node specific protection signal and also the node specific protection signal of the other end-node in at least one of the two directions of said bus.

2. An arrangement according to claim 1, wherein the protection signal transmitter of each node has different wavelengths.

3. An arrangement according to claim 1, wherein the protection signal transmitter of each node has the same wavelength.

4. An arrangement according to claim 1, wherein the protection signal transmitter is adapted to transmit a digital word that differs from the other nodes.

5. An arrangement according to claim 1, wherein A the protection signal transmitter transmits an sinusoidal modulated signal.

6. A method of detecting faults in an optical fibre network that includes at least two nodes which coact with at least two optical fibres to form a bus, wherein the bus end-nodes are coupled to a pair of spare fibres, and wherein each node has a central module which includes at least one central processor, at least two protection switches, and optical amplifiers, wherein said method comprises the steps of:
   transmitting from the nodes at each end of the bus, a node specific protection signal in at least one of the two directions of the bus with the protection signal transmitters;
   detecting at both end-nodes of the bus the corresponding node specific protection signal and the node specific protection signal transmitted from the other end-node, partly from the bus side and partly from the spare fibre side;
   detecting at each node the loss of all incoming power; and
   reshaping the bus with new end-nodes in the event of a fault on the bus.

7. A method according to claim 6, further comprising the step of:
   opening the protection switch in a first end-node when the first end-node detects the loss of its corresponding node specific protection signal incoming from a standard fibre and the loss of the node specific protection signal of a second end-node incoming from a standard fibre but does not detect the loss of the node specific protection signal of the second end-node incoming from the spare fibre.

8. A method according to claim 6, further comprising the step of:
   reporting that a fault exists on the spare fibre in a traffic direction from the first end-node to the second end-node when a first end-node detects a loss of its corresponding node specific protection signal incoming on a standard fibre but does not detect the loss of the node specific protection signal of the second end-node incoming on a standard fibre.

9. A method according to claim 6, further comprising the step of:
   reporting that a fault has occurred on the spare fibre in the traffic direction from the second end-node to the first end-node when the first end-node detects a loss of the node specific protection signal of the second end-node incoming on the spare fibre but does not detect the loss of the node specific protection signal of the second end-node incoming on a standard fibre.

10. A method according to claim 6, further comprising the step of:
    reporting that there is a fault with the node specific protection signal of the second end-node when a first end-node detects a loss of the node specific protection signal of the second end-node incoming on a standard fibre but does not detect the loss of its corresponding node specific protection signal incoming on a standard fibre.

11. A method according to claim 6, further comprising the step of:
    closing the protection switch and the amplifier pair of an intermediate node on the first side or the second side when the intermediate node detects a loss of all optical signals from a first side or from a second side, respectively.

* * * * *